United States Patent
Friedrich

(10) Patent No.: US 8,296,852 B2
(45) Date of Patent: Oct. 23, 2012

(54) TRANSPONDER, RFID SYSTEM, AND METHOD FOR RFID SYSTEM WITH KEY MANAGEMENT

(75) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 1065 days.

(21) Appl. No.: 11/822,309

(22) Filed: Jul. 5, 2007

(65) Prior Publication Data

US 2008/0012690 A1  Jan. 17, 2008

Related U.S. Application Data

(60) Provisional application No. 60/819,408, filed on Jul. 10, 2006.

(30) Foreign Application Priority Data

Jul. 5, 2006 (DE) .................. 10 2006 032 130

(51) Int. Cl.
H04L 29/06 (2006.01)
(52) U.S. Cl. ............ 726/27; 726/29; 380/30; 340/10.51
(58) Field of Classification Search .................... 380/30; 713/176; 726/27, 29; 340/10.1, 10.3, 10.51
See application file for complete search history.

(56) References Cited

U.S. PATENT DOCUMENTS

| 2004/0054717 A1* | 3/2004 | Aubry et al. .................. 709/203 |
| 2004/0054900 A1 | 3/2004 | He |
| 2005/0021982 A1* | 1/2005 | Popp et al. .................... 713/184 |
| 2006/0119487 A1* | 6/2006 | Atkinson et al. ......... 340/825.72 |
| 2006/0208066 A1* | 9/2006 | Finn et al. .................... 235/380 |
| 2007/0081671 A1* | 4/2007 | Ross et al. .................... 380/255 |

FOREIGN PATENT DOCUMENTS

DE  10 2006 002516 A1  7/2007

OTHER PUBLICATIONS

"RFID Handbuch," a textbook by Klaus Finkenzeller, HANSER Verlag, third edition, 2002, pp. 200 to 216.
Melanie R. Rieback et al., "A Battery-Powered Mobile Device for RFID Privacy Management", Department of Computer Science, Vrije Universiteit, Amsterdam, The Netherlands, Springer-Verlag Berlin Heidelberg 2005, pp. 184-194.

* cited by examiner

Primary Examiner — Justin T Darrow
(74) Attorney, Agent, or Firm — Baker Botts L.L.P.

(57) ABSTRACT

A transponder is provided, in particular a passive and/or backscatter-based transponder, for an RFID system, wherein at least one first piece of information can be stored in a first memory area on the transponder that is accessible in clear text only by a read access internal to the transponder, and a second piece of information can be stored in a second memory area that is accessible in clear text through an air interface for read access, and the second piece of information is generated from the first piece of information using an asymmetric encryption method. The invention further relates to an RFID system for wireless data exchange comprising a transponder and a base station, and a method for requesting write and/or read access to a transponder, in particular a passive and/or backscatter-based transponder.

15 Claims, 1 Drawing Sheet

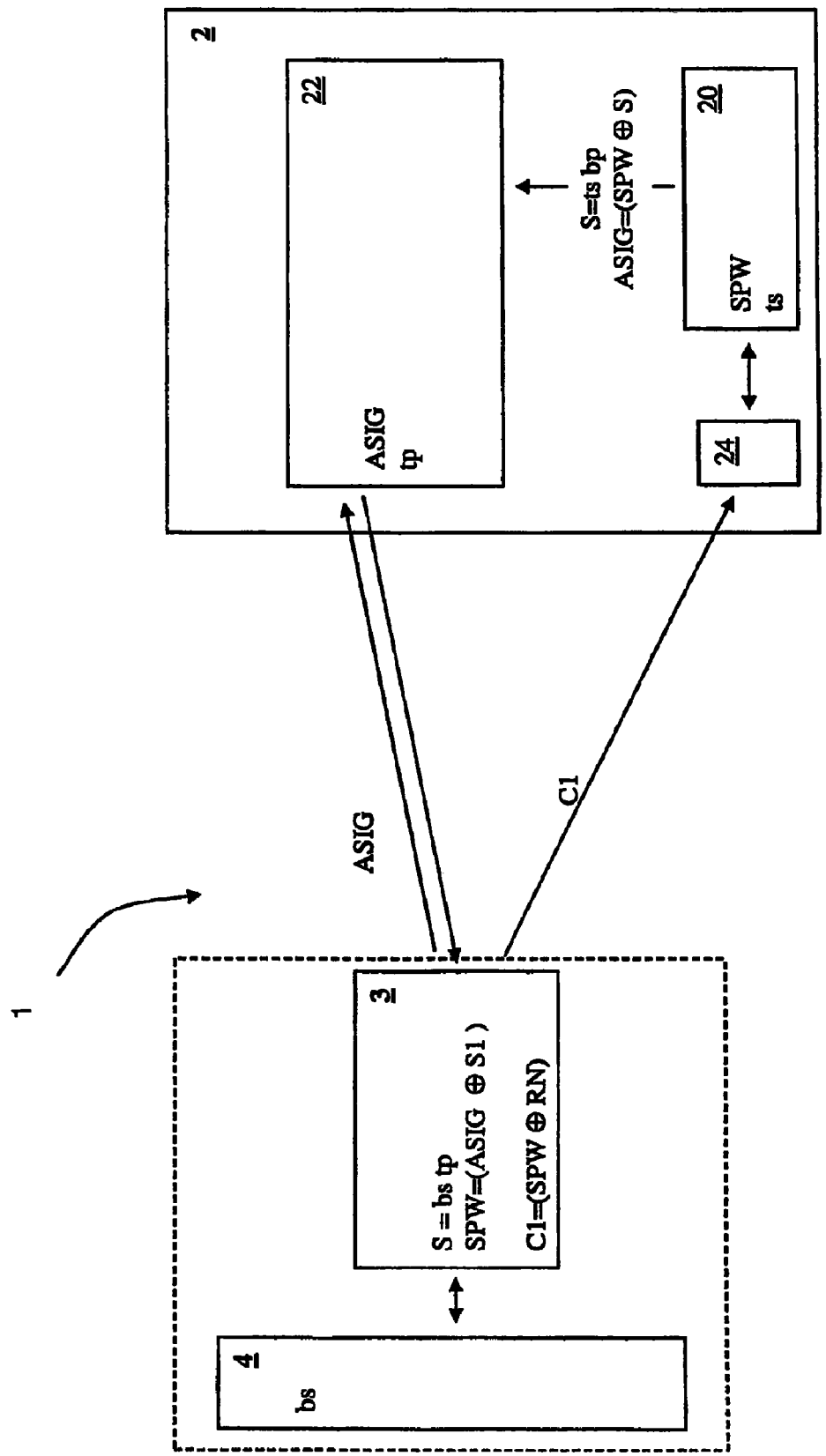

TRANSPONDER, RFID SYSTEM, AND METHOD FOR RFID SYSTEM WITH KEY MANAGEMENT

This nonprovisional application claims priority to German Patent Application No. DE 102006032130, which was filed in Germany on Jul. 5, 2006, and to U.S. Provisional Application No. 60/819,408, which was filed on Jul. 10, 2006, and which are both herein incorporated by reference.

BACKGROUND OF THE INVENTION

1. Field of the Invention

The present invention relates to a transponder for an RFID system, an RFID system for wireless data exchange comprising a transponder and a base station, and a method for requesting write and/or read access to a transponder, in particular a passive and/or backscatter-based transponder.

2. Description of the Background Art

A radio frequency identification (RFID) system typically has a base station or a reader (or reader unit) and a plurality of transponders or remote sensors, which are located in the response area of the base station at the same time. The transponders and their transmitting and receiving devices customarily do not have an active transmitter for data transmission to the base station. Such non-active systems are called passive systems if they do not have their own energy supply, and semi-passive systems if they have their own energy supply. Passive transponders take the energy they require for their supply from the electromagnetic field emitted by the base station.

In general, backscatter coupling is used to transmit data from a transponder to the base station using UHF or microwaves in the far field of the base station. To this end, the base station emits electromagnetic carrier waves, which the transmitting and receiving device in the transponder modulates and reflects appropriately for the data to be transmitted to the base station using a modulation method. The typical modulation methods for this purpose are amplitude modulation, phase modulation and/or amplitude shift keying (ASK) subcarrier modulation, in which the frequency or the phase position of the subcarrier is changed.

An access control method for transponders is described in the proposed standard ISO/IEC_CD 18000-6C dated Jan. 7, 2005, (see in particular ISO/IEC_CD 18000-6C section 6.3.2, pages 27-60). In this method, the transponder is first selected from among a plurality of transponders in a selection or arbitration process. The selection method described is a stochastic method in the form of a slotted ALOHA method. Such selection methods are described in detail in, for example, the "RFID Handbuch," a textbook by Klaus Finkenzeller, HANSER Verlag, third edition, 2002 (see in particular section 7.2, Vielfachzugriffsverfahren—Antikollision [multiple access methods—anticollision], pages 203 to 216).

An access control method is likewise described in, for example, DE 10 2006 002516 A1, which corresponds to U.S. Provisional application No. 60/838,889, and which is incorporated herein by reference.

To carry out an access operation, a reader typically transmits what is called a query command. The transponder responds to this query by transmitting a random number. The transmission of an acknowledge message isolates the transponder. The isolated transponder transmits protocol control bits (PC) and an identifier in the form of an electronic product code (EPC) to the reader. The protocol control bits contain information regarding a physical layer of the transmission path. Among other things, the identifier or the electronic product code EPC reflects a product identified by the transponder. The assignment of the EPC to the identified product is standardized, so that the product can be deduced from knowledge of the EPC.

After the transponder has transmitted the PC and EPC, read and/or write access to memory areas of the transponder by the base station is typically possible, unless certain areas are protected or locked by a password against read and/or write access. Moreover, read and/or write access to another memory area of the transponder can be permanently locked against direct access by the base station through an air interface and/or a PIN. Stored in this so-called private area are passwords, for example, wherein the memory area is accessible for a password comparison by an internal logic unit of the transponder, for example.

For write access to a password-protected area, one or more passwords must be transmitted by the querying base station to the transponder. It is customary for a symmetric method to be used for this process, i.e., the same passwords are stored in the base station and the transponder. A simple protection system is created in this way. However, a disadvantage of symmetrically distributed passwords or keys is the considerable effort required for password or key management. For access to a transponder, the associated password must be distributed to all participating base stations or readers. Especially in the case of data management systems which must be flexibly adaptable to changing infrastructures and/or applications, known as open data management systems, a considerable amount of effort would be required here for key distribution.

In addition, so-called asymmetric methods are known, in which data are encrypted by what is known as a public key, which is accessible to an unlimited number of participants, whereas only one participant or a limited number of participants knows a secret for decryption. Asymmetric methods are customary for authentification and/or authentication in the field of money transfers, for example. However, asymmetric methods are generally computationally intensive, and require a battery-operated transponder or another battery-operated unit.

SUMMARY OF THE INVENTION

It is therefore an object of the present invention to provide an RFID system for a wireless data exchange, a transponder for an RFID system, and a method for control of access to a transponder, which permit simple management of access control.

In a transponder for an RFID system according to an embodiment, in particular a passive and/or backscatter-based transponder, at least one first piece of information is stored in a first memory area that is accessible in clear text only by a read access internal to the transponder, and a second piece of information can be stored in a second memory area that is accessible in clear text through an air interface for read access, wherein the second piece of information is generated from the first piece of information using a public key of an asymmetric encryption method. The second piece of information can be read by any desired base station. An authorized base station has knowledge of a corresponding private key and can extract the first piece of information from the second piece of information using the key. In one embodiment, the transponder includes means for this purpose through which the second piece of information can be generated from the first piece of information. Transponder-internal adaptation of the second piece of information is possible in this regard through changes in parameters, in particular publicly disseminated parameters, of the asymmetric encryption method.

In another embodiment, the second piece of information can be generated by external means and can subsequently be recorded onto the transponder. This permits simple construction of the transponder.

In an embodiment of the invention, the first piece of information is a symmetric password that is accessible internally to the transponder by an internal logic unit of the transponder for a password comparison. Using the extracted first piece of information, an authorized base station can thus successfully request read and/or write access to the transponder and/or to certain data areas of the transponder.

In another embodiment of the invention, a third piece of information is stored on the transponder which identifies a coding for generating the second piece of information. The type of coding is characterized by a method, a key length, and similar information, for example.

In a further aspect of the invention, a security measure protects the second and/or third piece of information from read access through the air interface. Possible security measures include, for example, conditions, such as transmission of a correct transponder identification (tag ID) and/or a successfully performed selection and/or arbitration process. Additional security measures, such as protection through a password or the like, are not necessary in accordance with the invention.

In an embodiment of the invention, the asymmetric encryption method is an elliptic curve cryptosystem method. Here, the first piece of information can be coded by a secret key, which is a secret exchanged through transmission of an associated public key. The public keys are available to all participants here. But only by means of the asymmetrically distributed private key is it possible to generate the secret key, and hence extract the first piece of information from the second piece of information. In place of an elliptic curve cryptosystem method, a Diffie-Hellmann method, or a combination of the methods, is used in another embodiment.

The object is further attained by an RFID system for a wireless data exchange comprising at least one transponder and at least one base station, wherein at least one first piece of information is stored on the transponder in a first memory area that is accessible in clear text only by a read access internal to the transponder, and a second piece of information can be stored in a second memory area that is accessible in clear text through an air interface for read access, and the second piece of information is generated from the first piece of information using an asymmetric encryption method. The first piece of information can be calculated by the base station from the second piece of information and a key corresponding to the transponder's asymmetric encryption method, and write and/or read access for the base station to at least one first data area of the transponder is enabled after the first piece of information has been received. In this context, an authorized base station of the RFID system obtains write and/or read access to the first data areas of any desired transponder of the RFID system without the base station having knowledge of the first piece of information for enabling of the first data area for every transponder located in the system. According to one embodiment, a key is the same for a group of transponders. In another embodiment, different keys are assigned to different transponders. Base stations can be included in the system at any time by transmission of the key, even without knowledge of the first piece(s) of information of the transponders. In addition, base stations can be excluded from the RFID system by changing the asymmetric key data, without it being necessary to change all of the first pieces of information stored on the transponders to this end.

In one embodiment, at least one transponder has at least one second data area, wherein write and/or read access to the second data area of the transponder is enabled without transmission of the first piece of information. The RFID system can be used for products from the time of manufacture until sale to end consumers, for example. In this connection, a variety of information about the products could be open to any desired base stations. Other information can only be accessed by a certain group of authorized parties for reasons of data privacy and/or security; in one embodiment, this information is stored in a data area that is protected by the first piece of information. If the group of authorized parties changes, the relevant person can be excluded from the data exchange by changing the asymmetric encryption without having to change the first piece of information on the transponder. The second data area can be the same as the first memory area or can be assigned to a different memory area of the transponder.

The object is further attained by a method for requesting write and/or read access to a transponder of an RFID system, wherein at least one first piece of information is stored on the transponder in a first memory area that is accessible in clear text only by a read access internal to the transponder, and the write and/or read access to at least one first data area of the transponder is protected by the first piece of information. In addition, a second piece of information is stored on the transponder in a second memory area that is accessible through an air interface for read access in clear text, wherein the second piece of information is generated from the first piece of information using an asymmetric encryption method. According to the invention, the second piece of information is read from the transponder by a base station, the first piece of information is calculated by the base station from the second piece of information and a key corresponding to the asymmetric encryption method, and write and/or read access to the transponder is requested by the base station with transmission of the first piece of information. The first piece of information can only be extracted from the encrypted second piece of information by a base station that possesses the corresponding key. It is not necessary here for the first piece of information to be stored on the base station and/or for this information to be made available to the base station in any other manner.

In a further development of the invention, the base station determines the key, at least in part, from a base station memory area. In this context, a variety of keys that are associated with different transponders can be stored in the base station memory area. In one embodiment, the keys are retrieved from the memory area as a function of a tag ID.

In an embodiment of the invention, an elliptic curve cryptosystem method (ECC method) is used as the asymmetric encryption method. The ECC method permits secure encryption with short key lengths. In another embodiment, the Diffie-Hellman encryption method is used. In still other embodiments, the encryption methods can be combined with one another.

In another embodiment of the invention, the key is determined by the base station using the third piece of information. The third piece of information identifies a coding for generating the second piece of information. The type of encoding is identified, for example, by a method, a key length, and similar information. The key can include the public key of the transponder for the asymmetric encryption in the ECC method, for example.

In a further aspect of the invention, the third piece of information is read from the transponder. The third piece of information is available to the base station in a publicly accessible memory area.

In another embodiment of the invention, the third piece of information is determined from an agreement. The third piece of information, which defines, for example, a method for combining the first piece of information to create the second piece of information, can be defined by a standard. This makes it possible to incorporate additional base stations and/or transponders in an RFID system in a simple manner.

In one embodiment of the invention, the first piece of information is transmitted to the transponder as defined in a protocol. This prevents the first piece of information from being overheard by an unauthorized base station during transmission from the base station to the transponder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the sole FIGURE illustrates a schematic representation of an RFID system, according to an embodiment of the present invention.

DETAILED DESCRIPTION

The FIGURE schematically shows an inventive RFID system 1, having at least one transponder 2 and a base station 3. A memory 4 is associated with the base station.

The transponder 2 has at least one first memory area 20 and one second memory area 22. The first memory area 20 is a private memory area that is accessible in clear text only by a read access internal to the transponder by a logic unit 24. The first memory area 20 is not externally readable. A first piece of information is stored in the first memory area 20. In the embodiment shown, the first piece of information is a symmetric password SPW. The transponder 2 has, for example, data areas that are not shown, wherein security-relevant access such as read and/or write access or locking access to the data areas is only possible by the transmission of the symmetric password SPW. The symmetric password is, for example, a "kill password" or an "access password" in conformity with the proposed standard ISO/IEC_CD 18000-6C mentioned above.

The second memory area 22 is accessible through an air interface for read access in clear text. In one embodiment, read access is accessible only under conditions, for example the successful completion of an arbitration process. Stored in the second memory area 22 is a second piece of information that is an asymmetric piece of information ASIG that is generated from the first piece of information using an asymmetric encryption method.

In the embodiment shown, encryption is performed using the elliptic-curve cryptosystem method (ECC method). In this process, base stations and transponders agree publicly on a valid elliptic curve and a point P on this curve.

The base station 3 secretly obtains a random number bs, which is stored in a memory 4, for example. In an analogous manner, the transponder 2 secretly obtains a random number ts that is known only to the transponder. In the embodiment shown, ts is stored in the memory area 20. In another embodiment, ts is generated anew for each transmission. A public key bp=bs·P can be calculated in the base station 3. This key is made available to the transponder 2. In an analogous manner, the transponder 2 determines a public key tp=ts·P, which in the embodiment shown is stored in the memory area 22 that is accessible for read access. In the elliptic-curve cryptosystem, S=bs·tp=ts·bp. Thus a key S is provided that can easily be calculated by both the transponder 2 and the base station 3 using the public keys tp and bp.

The base station 3 reads the second piece of information, i.e. the asymmetric information ASIG, from the second memory area 22 of the transponder 2. Using the private key bs, the key S and thus the symmetric password SPW can be extracted from the asymmetric information ASIG by the base station 3.

To request read and/or write access to the transponder 2, the base station 3 transmits the extracted symmetric password SPW to the transponder 2. In the embodiment shown, the transmission takes place using a known protocol, wherein the symmetric password SPW is encrypted by a random number RN, which in one embodiment has previously been transmitted from the transponder to the base station.

Although, in the example embodiment, the inventive method requires the transponder to have an additional memory area for storing the second piece of information, i.e. the asymmetric information, the method does permit significantly simpler management of passwords than prior art methods.

In the embodiment shown, the piece of information tp for decrypting the symmetric password for the base station 3 is located in the accessible memory area 22 of the transponder. In other embodiments, this information is available from other sources, for example through the Internet.

The private key bs can likewise be made available to the base station 3 through the Internet or another information source.

In one embodiment, a RFID system that includes a number of base stations 3 and transponders 2 is used for a ski pass system. Here, a transponder 2 is attached to a ski pass. Stored in a first data area of the transponder 2 is, for example, information on the term of validity and/or the area of validity of the ski pass. This information is accessible for read access to a number of base stations, for example lift stations. In the general case, the information can also be made available to any other desired base stations that are not part of the ski pass system, without concern as to security and/or data privacy. Wireless transmission permits especially convenient handling of the ski pass. However, write access to the memory area is denied to the simple base stations associated with the lift stations or to base stations that are not part of the ski pass system. For example, the validity of the ski pass can be changed at special ticket sales locations by the purchase of additional days and/or areas of validity. Base stations associated with the ticket sales locations thus require write access to the transponder. However, due to the large number of lift tickets and the large number of transponders associated therewith, a considerable effort is required if all possible symmetric passwords of the transponders are to be provided to all ticket sales locations. A considerable security gap is created if all transponders have an identical symmetric password, as successfully breaking into one transponder would then make the entire system accessible to the attacker.

Thus, according to the invention, a unique symmetric password SPW is stored on each transponder 2. According to the invention, an asymmetric information ASIG that is available to all base stations is generated from the symmetric password SPW. An authorized base station 3, for example at the ticket sales location, possesses a corresponding key by means of which it extracts the unique symmetric password SPW of the transponder 2 from the asymmetric information ASIG. By means of this password, the base station 3 of the ticket sales location obtains write access to certain data areas of the transponder 2 so that the validity of the lift ticket can be changed.

It is obvious that additional information can be stored on the transponder 2 that is used for a ski pass, for example data concerning a medical condition of a lift ticket holder; this information can be rapidly read out by rescue personnel in the event of an accident, for example, and can be immediately made available for life-saving measures. However, for reasons of data privacy this private information of the ticket holder should never be made available to base stations that are not associated with the rescue personnel. This information can be protected on the transponder by an additional symmetric password, wherein the rescue personnel can rapidly extract the symmetric password in case of need using the key provided to them.

The ski pass system described represents only one possible example application that demonstrates the great flexibility of the system, which is to say the easy extensibility of the system with additional transponders and/or base stations. Other scenarios in which the inventive transponders 2 are associated with goods and/or persons are also possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transponder comprising:
   a first memory area operable to store first information that is accessible only by read access internal to the transponder;
   a second memory area operable to store second information that is accessible by read access external to the transponder through an air interface, the second information having been generated from the first information using a key calculated from a public key of an asymmetric encryption method; and
   logic circuitry operable to:
      access a transmission from a base station, the transmission comprising an encrypted version of the first information generated by the base station using the second information in the second memory area as accessed by the base station;
      decrypt the encrypted version of the first information in the transmission to extract a decrypted version of the first information;
      compare the decrypted version of the first information extracted from the transmission to the first information stored in the first memory area;
      based on the comparing, provide the base station read or write access to the first, the second, or another memory area of the transponder.

2. The transponder of claim 1, wherein the first information is a symmetric password that is accessible by the logic circuitry of the transponder for a password comparison.

3. The transponder of claim 1, wherein third information is stored in the first memory area of the transponder, the third information being used with the first information to generate the second information.

4. The transponder of claim 3, wherein a security measure protects the second or third information from read access external to the transponder through the air interface.

5. The transponder of claim 1, wherein the asymmetric encryption method is an elliptic curve cryptosystem method.

6. A method comprising:
   accessing a transmission from a base station, a first memory area of a transponder storing first information that is accessible only by read access internal to the transponder, a second memory area of the transponder storing second information that is accessible by read access external to the transponder through an air interface, the second information having been generated from the first information using a key calculated from a public key of an asymmetric encryption method, the transmission from the base station comprising an encrypted version of the first information generated by the base station using the second information in the second memory area as accessed by the base station;
   decrypting the encrypted version of the first information in the transmission to extract a decrypted version of the first information;
   comparing the decrypted version of the first information extracted from the transmission to the first information stored in the first memory area; and
   based on the comparing, providing the base station read or write access to the first, the second, or another memory area of the transponder.

7. The method of claim 6, wherein the first information is a symmetric password that is accessible by logic circuitry of the transponder for a password comparison.

8. The method of claim 6, wherein third information is stored in the first memory area of the transponder, the third information being used with the first information to generate the second information.

9. The method of claim 8, wherein a security measure protects the second or third information from read access external to the transponder through the air interface.

10. The method of claim 6, wherein the asymmetric encryption method is an elliptic curve cryptosystem method.

11. A computer-readable non-transitory medium embodying logic that is operable when executed to:
    access a transmission from a base station, a first memory area of a transponder storing first information that is accessible only by read access internal to the transponder, a second memory area of the transponder storing second information that is accessible by read access external to the transponder through an air interface, the second information having been generated from the first information using a key calculated from a public key of an asymmetric encryption method, the transmission from the base station comprising an encrypted version of the first information generated by the base station using the second information in the second memory area as accessed by the base station;
    decrypt the encrypted version of the first information in the transmission to extract a decrypted version of the first information;
    compare the decrypted version of the first information extracted from the transmission to the first information stored in the first memory area; and
    based on the comparing, provide the base station read or write access to the first, the second, or another memory area of the transponder.

12. The computer-readable non-transitory medium of claim 11, wherein the first information is a symmetric password that is accessible by logic circuitry of the transponder for a password comparison.

13. The computer-readable non-transitory medium of claim 11, wherein third information is stored in the first memory area of the transponder, the third information being used with the first information to generate the second information.

14. The computer-readable non-transitory medium of claim 13, wherein a security measure protects the second or third information from read access external to the transponder through the air interface.

15. The computer-readable non-transitory medium of claim 11, wherein the asymmetric encryption method is an elliptic curve cryptosystem method.

* * * * *